United States Patent
Chen et al.

(10) Patent No.: US 12,470,036 B2
(45) Date of Patent: Nov. 11, 2025

(54) OPTICAL FIBER AMPLIFIER COMPATIBLE WITH SMALL FORM-FACTOR PLUGGABLES (SFP+) PACKAGE

(71) Applicant: WUXI TACLINK OPTOELECTRONICS TECHNOLOGY CO., LTD., Wuxi (CN)

(72) Inventors: Jinlong Chen, Wuxi (CN); Songgui Wu, Wuxi (CN); Jianhua Hou, Wuxi (CN); Yunbin Feng, Wuxi (CN); Xianqin Li, Wuxi (CN)

(73) Assignee: WUXI TACLINK OPTOELECTRONICS TECHNOLOGY CO., LTD., Wuxi (CN)

(*) Notice: Subject to any disclaimer, the term of this patent is extended or adjusted under 35 U.S.C. 154(b) by 897 days.

(21) Appl. No.: 17/764,989

(22) PCT Filed: Jul. 30, 2020

(86) PCT No.: PCT/CN2020/105670
§ 371 (c)(1),
(2) Date: Mar. 30, 2022

(87) PCT Pub. No.: WO2022/016596
PCT Pub. Date: Jan. 27, 2022

(65) Prior Publication Data
US 2022/0385023 A1    Dec. 1, 2022

(30) Foreign Application Priority Data
Jul. 24, 2020    (CN) .......................... 202010725346.3

(51) Int. Cl.
*H01S 3/067*    (2006.01)
*G02B 6/42*    (2006.01)
(Continued)

(52) U.S. Cl.
CPC ...... *H01S 3/06704* (2013.01); *H01S 3/06716* (2013.01); *H01S 3/06754* (2013.01);
(Continued)

(58) Field of Classification Search
CPC .. G02B 6/4246; G02B 6/4292; G02B 6/4256; G02B 6/4261; G02B 6/4216;
(Continued)

(56) References Cited

U.S. PATENT DOCUMENTS

| | | | |
|---|---|---|---|
| 2009/0226138 A1* | 9/2009 | Kelly | H04B 10/40 385/89 |
| 2016/0103286 A1* | 4/2016 | Matsui | G02B 6/4246 398/139 |

FOREIGN PATENT DOCUMENTS

| | | |
|---|---|---|
| CA | 2383699 A1 | 3/2001 |
| CN | 102998755 A | 3/2013 |

(Continued)

OTHER PUBLICATIONS

Translation of CN-106451044A (Author: Chen) (Year: 2017).*
(Continued)

*Primary Examiner* — Thomas A Hollweg
*Assistant Examiner* — Kirsten D. Endresen
(74) *Attorney, Agent, or Firm* — Bayramoglu Law Offices LLC

(57) ABSTRACT

An optical fiber amplifier compatible with a small form-factor pluggables (SFP+) package includes a housing, and a circuit device and an optical path device that are disposed in the housing, where the housing includes a structure compatible with an SFP+ package and is provided with an accommodation space; both the circuit device and the optical path device are located in the accommodation space, and the optical path device is located below the circuit device; the circuit device is provided with a card edge connector, (Continued)

and the card edge connector can be exposed outside the housing. The optical fiber amplifier compatible with an SFP+ package has a compact internal space. The amplifier has an appearance compatible with a standard SFP+ package. An electrical interface pin also meets a requirement of an existing SFP+ package, and dynamic plugging and plug-and-play can be satisfied.

12 Claims, 3 Drawing Sheets

(51) Int. Cl.
*H01S 3/094* (2006.01)
*H01S 3/13* (2006.01)
*H01S 3/16* (2006.01)

(52) U.S. Cl.
CPC .... *H01S 3/06791* (2013.01); *H01S 3/094003* (2013.01); *H01S 3/1301* (2013.01); *H01S 3/1608* (2013.01); *G02B 6/4261* (2013.01); *G02B 6/4284* (2013.01)

(58) Field of Classification Search
CPC .... G02B 6/4245; G02B 6/4284; H04B 10/40; H01S 3/06704; H01S 3/06754; H01S 3/1608; H01S 3/06716; H01S 3/06791; H01S 3/094003; H01S 3/1301
See application file for complete search history.

(56) References Cited

FOREIGN PATENT DOCUMENTS

| CN | 103493307 A | * | 1/2014 | ........... G02B 6/4261 |
|----|-------------|---|--------|------------------------|
| CN | 105515676 A |   | 4/2016 |                        |
| CN | 106033864 A |   | 10/2016 |                       |
| CN | 106451044 A |   | 2/2017 |                        |
| CN | 107689540 A |   | 2/2018 |                        |
| CN | 209487927 U |   | 10/2019 |                       |

OTHER PUBLICATIONS

Aiyden; Differences, Compatibility, and Interoperation of SFP+ and XFP, QSFPTEK, Mar. 2025; accessed at url: https://www.qsfptek.com/qt-news/xfp-vs-sfp-differences-compatibility-interoperation.html?srsltid=AfmBOop417IE9auMxN3-slAd3JqwMk66YIr9bh_VZYAtljxE_Rk9ijpO (Year: 2025).*
Translation of CN-103493307A (Author: Nguyen) (Year: 2014).*
Laser Focus World, 980 nm pump lasers from II-VI Incorporated include 3-pin micro-pumps; Nov. 2018; accessed at url: https://www.laserfocusworld.com/lasers-sources/article/16571388/980-nm-pump-lasers-from-ii-vi-incorporated-include-3-pin-micro-pumps (Year: 2017).*

* cited by examiner

OPTICAL FIBER AMPLIFIER COMPATIBLE WITH SMALL FORM-FACTOR PLUGGABLES (SFP+) PACKAGE

CROSS REFERENCE TO THE RELATED APPLICATIONS

This application is the national phase entry of International Application No. PCT/CN2020/105670, filed on Jul. 30, 2020, which is based upon and claims priority to Chinese Patent Application No. 202010725346.3, filed on Jul. 24, 2020, the entire contents of which are incorporated herein by reference.

TECHNICAL FIELD

The present disclosure relates to the technical field of optical fiber amplifiers, and in particular, to an optical fiber amplifier compatible with a small form-factor pluggables (SFP+) package.

BACKGROUND

Due to the rapid development of modern communication, there are increasingly high requirements for compatibility and integration of a transmission system. However, the compatibility generally brings a greater loss, and a high requirement for integration of the system imposes an increasingly high requirement on an appearance and a volume of an erbium-doped fiber amplifier (EDFA) and requires the EDFA to be pluggable in an existing system for convenient use.

SUMMARY

The present disclosure provides an optical fiber amplifier compatible with an SFP+ package to resolve a problem of failing to realize hot plugging while reducing a volume in the prior art.

According to an aspect of the present disclosure, an optical fiber amplifier compatible with an SFP+ package is provided, including a housing, and a circuit device and an optical path device that are disposed in the housing, where the housing includes a structure compatible with an SFP+ package, and an accommodation space is arranged in the housing; both the circuit device and the optical path device are located in the accommodation space, and the optical path device is located below the circuit device; and the circuit device is provided with a card edge connector, and the card edge connector can be exposed outside the housing.

Further, the housing includes a base and a cover plate covering the base, and the accommodation space is formed on the base.

Further, the housing is further provided with a module unlocking mechanism, and the module unlocking mechanism is configured to lock or unlock the housing and an installation cage of the optical fiber amplifier compatible with an SFP+ package.

Further, the module unlocking mechanism includes a pull ring, a sliding piece, and an elastic member, where the pull ring is disposed at one end of the base, the sliding piece is disposed on the cover plate, the elastic member is disposed on the sliding piece, the pull ring is connected to the sliding piece, the sliding piece can be pushed when the pull ring is pulled, the elastic member can be compressed to unlock the housing and the installation cage of the optical fiber amplifier compatible with an SFP+ package, and the sliding piece can return to a default state under elastic force of the elastic member when the pull ring is released, to lock the housing and the installation cage of the optical fiber amplifier compatible with an SFP+ package.

Further, the elastic member includes springs symmetrically disposed on two sides of the sliding piece respectively.

Further, the optical path device includes a two-in-one device, a three-in-one device, an erbium-doped fiber, and an adapter, where the erbium-doped fiber includes a ring structure, both the two-in-one device and the three-in-one device are located in the ring structure, the two-in-one device is connected to a pump light source, an input terminal of the two-in-one device is configured to input an optical signal, an output terminal of the two-in-one device and an input terminal of the three-in-one device are connected by using the erbium-doped fiber, an output terminal of the three-in-one device is configured to output an optical signal, the adapter is located outside the ring structure, and both the two-in-one device and the three-in-one device are connected to the adapter.

Further, the two-in-one device includes a first isolator and a wavelength division multiplexer, and the three-in-one device includes a second isolator, an optical splitter, and a photodiode.

Further, the pump light source includes a three-pin uncooled pump laser.

Further, the circuit device includes a printed circuit board (PCB), and a pump light source, a photodetector, an analog circuit, and a digital circuit that are disposed on the PCB.

Further, the analog circuit and the digital circuit each are disposed on two surfaces of the PCB in a form of a patch.

The optical fiber amplifier compatible with an SFP+ package in the present disclosure has very compact internal space. The product has an appearance compatible with a standard SFP+package. An electrical interface pin also meets a requirement of an existing SFP+ package, and dynamic plugging and plug-and-play can be satisfied. Therefore, the optical fiber amplifier is very convenient to use.

BRIEF DESCRIPTION OF THE DRAWINGS

The accompanying drawings are provided for further understanding of the present disclosure, and constitute part of the specification. The accompanying drawings and the following specific implementations of the present disclosure are intended to explain the present disclosure, rather than to limit the present disclosure. In the accompanying drawings.

DETAILED DESCRIPTION OF THE EMBODIMENTS

It should be noted that the embodiments in the present disclosure or features in the embodiments may be combined in a non-conflicting manner. The present disclosure will be described in detail below with reference to the accompanying drawings and the embodiments.

To make persons skilled in the art better understand the solutions in the present disclosure, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

It should be noted that the terms "first", "second", and so on in the specification and claims of the present disclosure and in the accompanying drawings are intended to distinguish between similar objects but do not necessarily indicate a specific order or sequence. It should be understood that the data termed in such a way is interchangeable in proper circumstances such that the embodiments of the present disclosure described herein can be implemented in other orders than the order illustrated or described herein. Moreover, the terms "include", "have" and their variants mean to cover a non-exclusive inclusion. For example, a process, method, system, product or device that includes a list of steps or units is not necessarily limited to those steps or units which are clearly listed. Instead, they may include other steps or units which are not expressly listed or inherent to such a process, method, product, or device.

Figure 1:
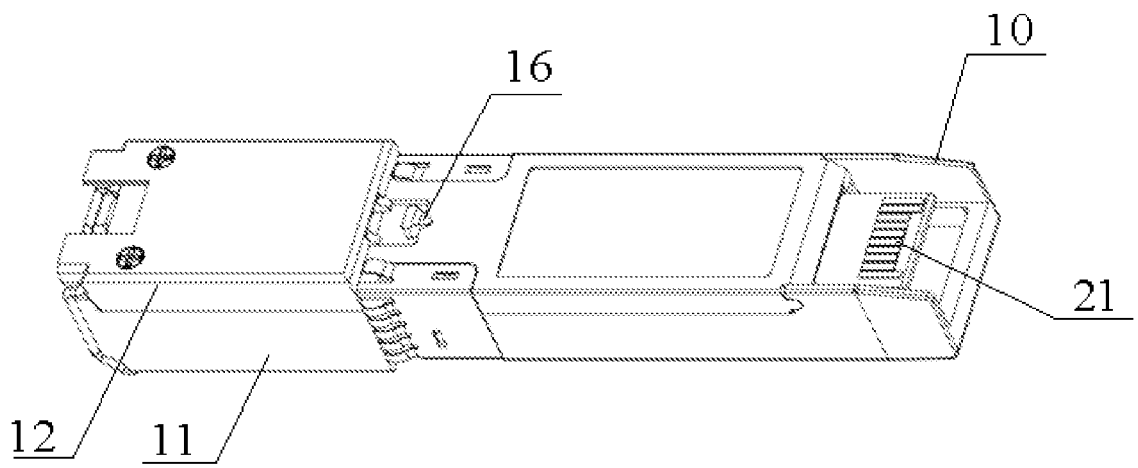
FIG. 1 is a schematic diagram of an outline structure of an optical fiber amplifier compatible with an SFP+ package according to the present disclosure.
Figure 2:
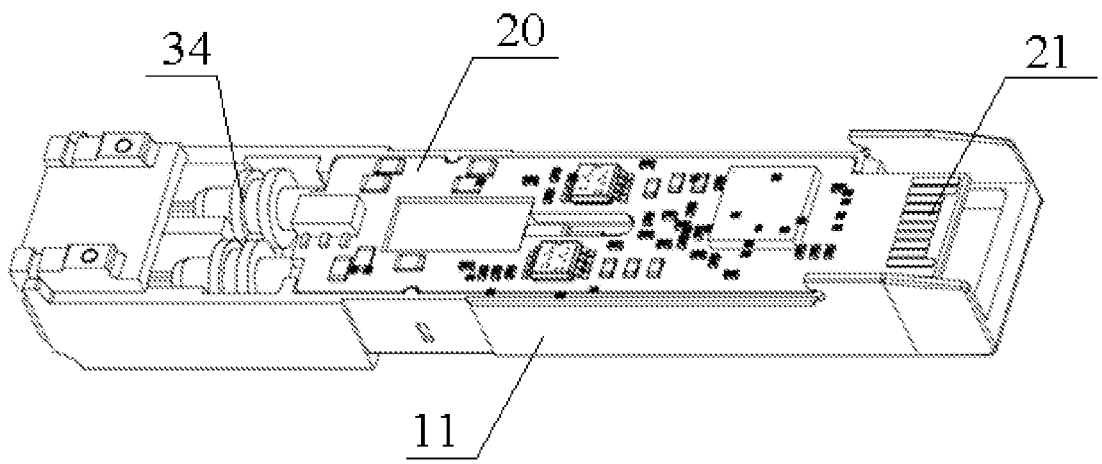
FIG. 2 is a schematic structural diagram of the optical fiber amplifier compatible with an SFP+ package in FIG. 1 after a cover plate is removed.
Figure 3:
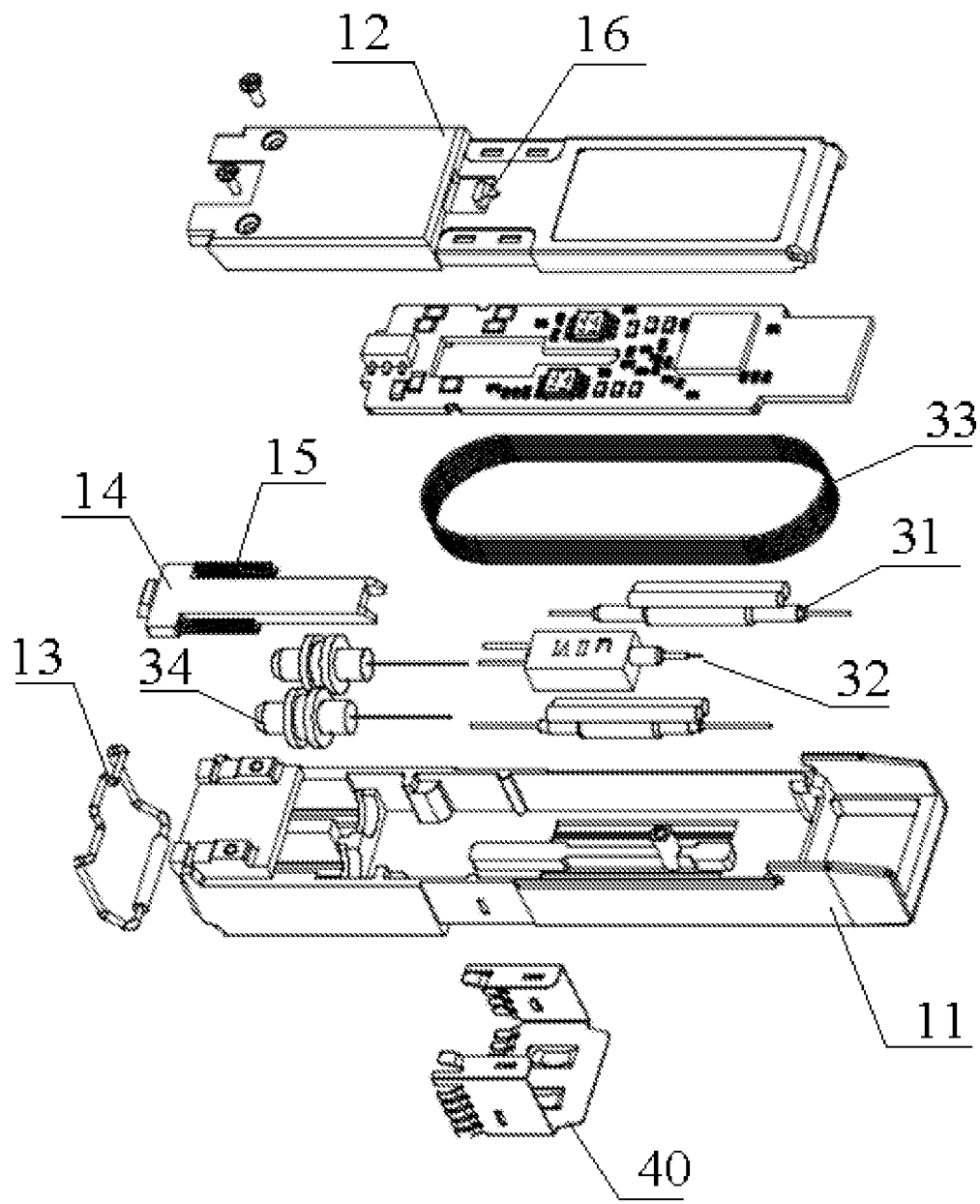
FIG. 3 is a schematic exploded view of an optical fiber amplifier compatible with an SFP+package according to the present disclosure.

An embodiment provides an optical fiber amplifier compatible with an SFP+ package. As shown in FIG. 1 to FIG. 3, the optical fiber amplifier compatible with an SFP+ package includes a housing 10, and a circuit device 20 and an optical path device 30 that are disposed in the housing 10, where the housing 10 includes a structure compatible with an SFP+ package, and an accommodation space is arranged in the housing; both the circuit device 20 and the optical path device 30 are located in the accommodation space, and the optical path device 30 is located below the circuit device 20; and the circuit device 20 is provided with a card edge connector 21, and the card edge connector 21 can be exposed outside the housing 10.

The optical fiber amplifier compatible with an SFP+ package in this embodiment of the present disclosure has very compact internal space. The product has an appearance compatible with a standard SFP+ package. An electrical interface pin also meets a requirement of an existing SFP+ package, and dynamic plugging and plug-and-play can be satisfied. Therefore, the optical fiber amplifier is very convenient to use.

It should be noted that SFP+ in this embodiment of the present disclosure can be simply understood as an upgraded version of a gigabit interface converter (GBIC).

Specifically, the housing 10 includes a base 11 and a cover plate 12 covering the base 11, and the accommodation space is formed on the base 11.

It should be noted that, as shown in FIG. 3, the optical fiber amplifier compatible with an SFP+ package in this embodiment of the present disclosure further includes an electro magnetic compatibility (EMC) spring 40, and the EMC spring 40 is configured to fix the base and the cover plate 12 after the cover plate is covering the base.

It should be understood that the housing 10 adopts a form compatible with the SFP+ package. The housing 10 includes the base 11 and the cover plate 12 covering the base 11, and the base 11 is provided with the accommodation space. The circuit device 20 includes a PCB, a passive device is disposed on the base 11, a pump light source and a photodetector are disposed on the PCB, and the optical path device 30 is located below the PCB. A golden-finger-type electrical interface is disposed on one side of the PCB. The optical fiber amplifier compatible with an SFP+ package in the present disclosure has a compact structure and is compatible with a size and a pin diagram of a traditional SFP+optical transceiver module.

Specifically, the housing 10 is further provided with a module unlocking mechanism to easily install the optical fiber amplifier compatible with an SFP+ package. The module unlocking mechanism is configured to lock or unlock the housing and an installation cage of the optical fiber amplifier compatible with an SFP+ package.

In some implementations, the module unlocking mechanism includes a pull ring 13, a sliding piece 14, and an elastic member 15, where the pull ring 13 is disposed at one end of the base 11, the sliding piece 14 is disposed on the cover plate 12, the elastic member 15 is disposed on the sliding piece 14, the pull ring 13 is connected to the sliding piece 14, the sliding piece 14 can be pushed when the pull ring 13 is pulled, the elastic member 15 can be compressed to unlock the housing and the installation cage of the optical fiber amplifier compatible with an SFP+ package, and the sliding piece 14 can return to a default state under elastic force of the elastic member 15 when the pull ring 13 is released, to lock the housing and the installation cage of the optical fiber amplifier compatible with an SFP+ package.

Preferably, the elastic member 15 includes springs symmetrically disposed on two sides of the sliding piece 14 respectively.

As shown in FIG. 3, during unlocking, the pull ring 13 is pulled to push the sliding piece 14 to move forward, a locking shrapnel on the cage is squeezed by using an inclined plane of a head of the sliding piece 14, such that the locking shrapnel is disengaged from a triangular piece 16 for locking on the cover plate 11, to realize unlocking. When the pull ring 13 is released, elastic force of the two springs on the sliding piece 14 is used to restore the sliding piece 14 to the default state, so as to facilitate the locking when the optical fiber amplifier compatible with an SPF+ package is inserted into the cage.

Figure 4:
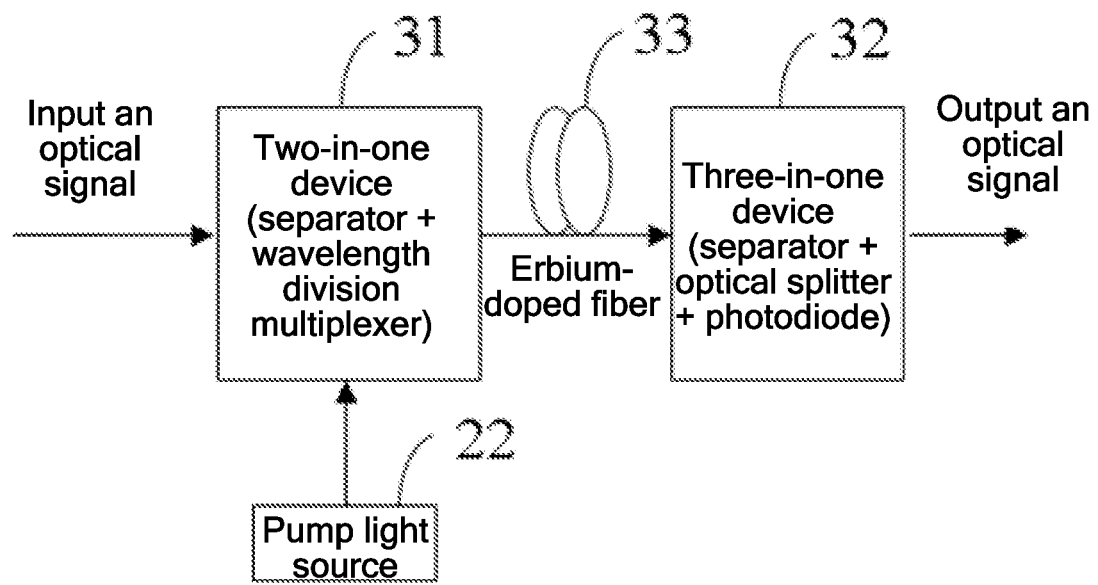
FIG. 4 is a structural block diagram of an optical path device according to the present disclosure.

Specifically, as shown in FIG. 3 and FIG. 4, the optical path device 30 includes a two-in-one device 31, a three-in-one device 32, an erbium-doped fiber 33, and an adapter 34, where the erbium-doped fiber 33 includes a ring structure, both the two-in-one device 31 and the three-in-one device 33 are located in the ring structure, the two-in-one device 31 is connected to a pump light source 22, and an input terminal of the two-in-one device 31 is configured to input an optical signal, an output terminal of the two-in-one device 31 and an input terminal of the three-in-one device 32 are connected by using the erbium-doped fiber 33, an output terminal of the three-in-one device 32 is configured to output an optical signal, the adapter 34 is located outside the ring structure, and both the two-in-one device 31 and the three-in-one device 32 are connected to the adapter 34.

Further, the two-in-one device 31 specifically includes a first isolator and a wavelength division multiplexer, and the three-in-one device 32 includes a second isolator, an optical splitter, and a photodiode.

It should be understood that the two-in-one device 31 is connected to the pump light source 22, and the two-in-one device 31 and the three-in-one device 32 are connected by using the erbium-doped fiber 33. The two-in-one device 31 is connected to an input optical signal, and the three-in-one device 32 is connected to an output optical signal. The optical fiber amplifier compatible with an SFP+ package in this embodiment can monitor output power in real time, such that the amplifier can maintain a stable output.

Preferably, the pump light source 22 includes a three-pin uncooled pump laser.

It should be noted that the adapter 34 is placed in an annular groove of the base 11 as required by a protocol. During cover closing, an upper cover is used to press the adapter tightly to completely position the adapter. The pump light source 22 is placed in the middle of the base and is in close contact with a boss at a corresponding position of the base to ensure good heat dissipation. The optical path device and a heat-shrinkable melting point are placed on two sides of the pump light source, and it is ensured that there is enough space between the device and two side walls inside the base to place the erbium-doped fiber. The circuit device is placed directly above the whole optical path device in the base as required by the protocol.

The appearance and the circuit device of the optical fiber amplifier compatible with an SFP+package in this embodiment of the present disclosure fully comply with related requirements in SFF-8432 V5.2, and a corresponding SFP+ cage and electrical interface can be used to realize hot plugging of the amplifier.

Specifically, the circuit device includes the PCB, and the pump light source, the photodetector, an analog circuit, and a digital circuit that are disposed on the PCB.

Preferably, the analog circuit and the digital circuit each are disposed on two surfaces of the PCB in a form of a patch.

It should be understood that, in the design of the PCB, devices are placed in positive and negative directions in the form of a patch to minimize a size of the PCB. In the layout, the analog circuit and the digital circuit are placed in a relatively centralized manner based on functions, so as to avoid interference caused by the digital part to the analog circuit, especially to avoid impact on detection of an output signal light.

In some implementations, an outline dimension of the housing 10 is 72 mm×13.55 mm×8.55 mm. A thin optical fiber with a diameter of 165 μm is mainly located inside the housing, and a diameter of the erbium-doped fiber is also 165 μm. This saves space and makes an EDFA compatible with an SFP+ package possible.

Because a communication network outside the product still mostly uses a 250 μm optical fiber, if the 165 μm optical fiber is directly used for input and output terminals of the product, an additional loss is caused due to different mode field diameters. In order to resolve this problem, this embodiment of the present disclosure uses a synthetic device with a hybrid optical fiber type (the 250 μm optical fiber is used for the input terminal of the two-in-one device and the output terminal of the three-in-one device; and the 165 μm optical fiber is used for the output terminal and a pump terminal of the two-in-one device and the input terminal of the three-in-one device). In this way, the 250 μm optical fiber is switched to the 165 μm optical fiber by using the synthetic device, and then the 165 μm optical fiber is switched to the 250 μm optical fiber by using the three-in-one device with a hybrid optical fiber after the 165 μm optical fiber is connected to the 165 μm erbium-doped fiber. The 165 μm optical fiber is used for the pump terminal of the two-in-one device. A diameter of a pumped fiber in the optical fiber amplifier compatible with an SFP+package in the present disclosure is also 165 μm. In this way, a pump can be welded smoothly. In the optical fiber amplifier compatible with an SFP+ package in this embodiment of the present disclosure, there is no 250 μm optical fiber for the 165 μm optical fiber at a welding point, which avoids an additional loss caused by different mode field diameters of the optical fibers.

In order to realize a miniaturized amplifier, the present disclosure further uses a double-core heat shrinkable sleeve, and two optical fiber welding joints are placed in one heat shrinkable sleeve, to save space to a greatest extent.

Because output power of the amplifier in the present disclosure is not very large (at most 16 dbm output power is supported), and an outline dimension of a module is only 72 mm×13.55 mm×8.55 mm, only a small uncooled pump can be selected. The pump laser adopts a three-pin uncooled pump. Because the product generates a small amount of heat during normal operation, and the heat can be dissipated conveniently, a reliability requirement of the product is satisfied.

An internal structure of the optical fiber amplifier compatible with an SFP+ package in this embodiment of the present disclosure adopts a multi-layer design, and the optical path device is placed under the PCB and above the base. The optical path device is a glass package without a metal sleeve package. In this way, when the optical path device is in contact with the PCB, the devices on the PCB will not be short-circuited. In addition, the optical fiber amplifier compatible with an SFP+ package in the present disclosure has the compact structure and is fully compatible with the size and the pin diagram of the traditional SFP+ optical transceiver module. The present disclosure is small and pluggable, can be installed conveniently, and has extremely low power consumption. Therefore, the present disclosure is very suitable for a high-density integrated transmitting or receiving board card, and can meet needs of a backbone network, an access network, and a cable TV network of an optical fiber communication system.

It can be understood that the above implementations are merely exemplary implementations used to illustrate the principle of the present disclosure, and the present disclosure is not limited thereto. Various modifications and improvements can be made by those of ordinary skill in the art without departing from the spirit and essence of the present disclosure, and these modifications and improvements are also considered as falling within the protection scope of the present disclosure.

What is claimed is:

1. An optical fiber amplifier compatible with a small form-factor pluggables plus (SFP+) package, comprising: a housing, a circuit device and an optical path device, wherein the circuit device and the optical path device are disposed in the housing, the housing comprises a structure compatible with the SFP+ package, and an accommodation space is arranged in the housing; the circuit device and the optical path device are located in the accommodation space, and the optical path device is located below the circuit device; and the circuit device is provided with a card edge connector, and the card edge connector is configured to be exposed outside the housing, wherein the optical path device comprises a two-in-one device, a three-in-one device, an erbium-doped fiber, and an adapter, wherein the erbium-doped fiber comprises a ring structure, the two-in-one device and the three-in-one device are located in the ring structure, the two-in-one device is connected to a pump light source, an input terminal of the two-in-one device is configured to input a first optical signal, an output terminal of the two-in-one device and an input terminal of the three-in-one device are connected by using the erbium-doped fiber, an output terminal of the three-in-one device is configured to output a second optical signal, the adapter is located outside the ring structure and is located inside the accommodation space inside the housing, and the two-in-one device and the three-in-one device are directly optically connected to the adapter.

2. The optical fiber amplifier compatible with the SFP+ package according to claim 1, wherein the housing comprises a base and a cover plate covering the base, and the accommodation space is formed on the base.

3. The optical fiber amplifier compatible with the SFP+ package according to claim 2, wherein the housing is further provided with a module unlocking mechanism, and the module unlocking mechanism is configured to lock or unlock the housing and an installation cage of the optical fiber amplifier compatible with the SFP+ package.

4. The optical fiber amplifier compatible with the SFP+ package according to claim 3, wherein the module unlocking mechanism comprises a pull ring, a sliding piece, and an elastic member, wherein the pull ring is disposed at one end of the base, the sliding piece is disposed on the cover plate, the elastic member is disposed on the sliding piece, the pull ring is connected to the sliding piece, the sliding piece is configured to be pushed when the pull ring is pulled, the elastic member is configured to be compressed to unlock the housing and the installation cage of the optical fiber amplifier compatible with the SFP+ package, and the sliding piece is configured to return to a default state under an elastic force of the elastic member when the pull ring is released, to lock the housing and the installation cage of the optical fiber amplifier compatible with the SFP+ package.

5. The optical fiber amplifier compatible with the SFP+ package according to claim 4, wherein the elastic member comprises springs symmetrically disposed on two sides of the sliding piece respectively.

6. The optical fiber amplifier compatible with the SFP+ package according to claim 5, wherein the circuit device comprises a printed circuit board (PCB), and a pump light source, a photodetector, an analog circuit, and a digital circuit, wherein the pump light source, the photodetector, the analog circuit, and the digital circuit are disposed on the PCB.

7. The optical fiber amplifier compatible with the SFP+ package according to claim 4, wherein the circuit device comprises a printed circuit board (PCB), and a pump light source, a photodetector, an analog circuit, and a digital circuit, wherein the pump light source, the photodetector, the analog circuit, and the digital circuit are disposed on the PCB.

8. The optical fiber amplifier compatible with the SFP+ package according to claim 3, wherein the circuit device comprises a printed circuit board (PCB), and a pump light source, a photodetector, an analog circuit, and a digital circuit, wherein the pump light source, the photodetector, the analog circuit, and the digital circuit are disposed on the PCB.

9. The optical fiber amplifier compatible with the SFP+ package according to claim 2, wherein the circuit device comprises a printed circuit board (PCB), and a pump light source, a photodetector, an analog circuit, and a digital circuit, wherein the pump light source, the photodetector, the analog circuit, and the digital circuit are disposed on the PCB.

10. The optical fiber amplifier compatible with the SFP+ package according to claim 1, wherein the two-in-one device comprises a first isolator and a wavelength division multiplexer, and the three-in-one device comprises a second isolator, an optical splitter, and a photodiode.

11. The optical fiber amplifier compatible with the SFP+ package according to claim 1, wherein the pump light source comprises a three-pin uncooled pump laser.

12. The optical fiber amplifier compatible with the SFP+ package according to claim 1, wherein the circuit device comprises a printed circuit board (PCB), and a pump light source, a photodetector, an analog circuit, and a digital circuit, wherein the pump light source, the photodetector, the analog circuit, and the digital circuit are disposed on the PCB.

* * * * *